US009344952B2

(12) United States Patent
Shrum, Jr. et al.

(10) Patent No.: US 9,344,952 B2
(45) Date of Patent: *May 17, 2016

(54) PERSONAL WIRELESS COVERAGE MAPS

(71) Applicant: AT&T Intellectual Property I, L.P., Atlanta, GA (US)

(72) Inventors: Edgar Shrum, Jr., Smyrna, GA (US); Barrett Kreiner, Woodstock, GA (US); Steven Wright, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,174

(22) Filed: Jul. 6, 2015

(65) Prior Publication Data
US 2015/0312846 A1 Oct. 29, 2015

Related U.S. Application Data

(63) Continuation of application No. 13/834,480, filed on Mar. 15, 2013, now Pat. No. 9,080,889, which is a continuation of application No. 13/614,719, filed on Sep. 13, 2012, now Pat. No. 8,401,573, which is a continuation of application No. 11/969,038, filed on Jan. 3, 2008, now Pat. No. 8,285,310.

(51) Int. Cl.
*H04W 48/04* (2009.01)
*H04W 48/18* (2009.01)
(Continued)

(52) U.S. Cl.
CPC ............... *H04W 48/04* (2013.01); *G01C 21/26* (2013.01); *G01C 21/34* (2013.01); *G01C 21/3461* (2013.01); *H04W 4/021* (2013.01); *H04W 4/028* (2013.01); *H04W 48/18* (2013.01)

(58) Field of Classification Search
CPC ..... H04W 48/04; H04W 4/028; H04W 4/021; H04W 48/18; G01C 21/3461; G01C 21/26; G01C 21/34
USPC ............................ 455/456.2, 423, 67.11–67.7
See application file for complete search history.

(56) References Cited

U.S. PATENT DOCUMENTS 5,023,900 A 6/1991 Tayloe et al.
6,035,198 A 3/2000 Wiehe
(Continued)

OTHER PUBLICATIONS

United States Patent and Trademark Office, "Office Action," issued in connection with U.S. Appl. No. 111/969,038, on Jun. 9, 2011 (9 pages).
(Continued)

*Primary Examiner* — Sharad Rampuria
(74) *Attorney, Agent, or Firm* — Hanley, Flight & Zimmerman, LLC

(57) ABSTRACT

Example methods disclosed herein to provide a map to a wireless device include, in response to a request received from the wireless device, processing wireless session records to determine respective status of a plurality of wireless services in a first geographic region associated with the wireless device. Disclosed example methods also include, based on the processing of the wireless session records, generating map data identifying a location of the wireless device, a status of a first one of the wireless services in a second geographic region included in the first geographic region, and a status of a second one of the wireless services in a third geographic region included in the first geographic region. Disclosed example methods further include transmitting the map data to the wireless device.

20 Claims, 5 Drawing Sheets

(51) Int. Cl.
*H04W 48/02* (2009.01)
*G01C 21/26* (2006.01)
*G01C 21/34* (2006.01)
*H04W 4/02* (2009.01)

(56) References Cited

U.S. PATENT DOCUMENTS

| | | | |
|---|---|---|---|
| 6,119,001 | A | 9/2000 | Delis et al. |
| 6,414,635 | B1 | 7/2002 | Stewart et al. |
| 6,622,082 | B1 | 9/2003 | Schmidt et al. |
| 6,748,213 | B1 | 6/2004 | Kim |
| 6,785,544 | B2 | 8/2004 | Kim et al. |
| 6,859,653 | B1 | 2/2005 | Ayoub et al. |
| 7,039,427 | B2 | 5/2006 | Tachikawa |
| 7,155,201 | B2 | 12/2006 | Lugo Saucedo et al. |
| 7,158,790 | B1 | 1/2007 | Elliott |
| 7,369,848 | B2 | 5/2008 | Jiang |
| 7,457,608 | B2 | 11/2008 | Shah |
| 7,522,940 | B2 | 4/2009 | Jendbro et al. |
| 7,603,115 | B2 | 10/2009 | Banavar et al. |
| 7,835,749 | B1 | 11/2010 | Hart et al. |
| 7,937,083 | B2 | 5/2011 | Oommen |
| 8,078,189 | B2 | 12/2011 | Chang et al. |
| 8,086,245 | B2 | 12/2011 | Karaoguz et al. |
| 8,116,787 | B1 * | 2/2012 | Lektuai ............... 455/456.2 |
| 8,150,400 | B1 | 4/2012 | Jordan, Jr. |
| 8,285,310 | B1 | 10/2012 | Shrum, Jr. et al. |
| 8,971,919 | B2 | 3/2015 | Do et al. |
| 8,971,932 | B2 | 3/2015 | Mapes |
| 2002/0022483 | A1 | 2/2002 | Thompson et al. |
| 2003/0008619 | A1 * | 1/2003 | Werner ............... 455/67.1 |
| 2003/0069842 | A1 | 4/2003 | Kight et al. |
| 2003/0186696 | A1 | 10/2003 | Klatt et al. |
| 2004/0077359 | A1 | 4/2004 | Bernas et al. |
| 2004/0203909 | A1 | 10/2004 | Koster |
| 2005/0239454 | A1 | 10/2005 | Kawashima et al. |
| 2006/0183487 | A1 * | 8/2006 | Allen et al. ............ 455/456.5 |
| 2007/0032235 | A1 | 2/2007 | Wahl et al. |
| 2007/0211676 | A1 | 9/2007 | Sharma et al. |
| 2008/0045234 | A1 | 2/2008 | Reed |
| 2011/0105080 | A1 | 5/2011 | Haughn et al. |
| 2013/0013188 | A1 | 1/2013 | Shrum, Jr. et al. |
| 2013/0204530 | A1 | 8/2013 | Shrum, Jr. et al. |

OTHER PUBLICATIONS

United States Patent and Trademark Office, "Final Office Action," issued in connection with U.S. Appl. No. 11/969,038, on Jan. 17, 2012 (10 pages).

United States Patent and Trademark Office, "Panel Decision from Pre-Appeal Brief Review," issued in connection with U.S. Appl. No. 11/969,038, on May 29, 2012 (2 pages).

United States Patent and Trademark Office, "Notice of Allowance," issued in connection with U.S. Appl. No. 11/969,038, on Jun. 7, 2012 (14 pages).

United States Patent and Trademark Office, "Notice of Allowance," issued in connection with U.S. Appl. No. 13/614,719, on Nov. 16, 2012 (8 pages).

United States Patent and Trademark Office, "Notice of Allowance", issued in connection with U.S. Appl. No. 13/834,480, dated Mar. 12, 2015 (11 pages).

* cited by examiner

PERSONAL WIRELESS COVERAGE MAPS

RELATED APPLICATION(S)

This patent arises from a continuation of U.S. patent application Ser. No. 13/834,480 (now U.S. Pat. No. 9,080,889), entitled "PERSONAL WIRELESS COVERAGE MAP" and filed on Mar. 15, 2013, which is a continuation of U.S. patent application Ser. No. 13/614,719 (now U.S. Pat. No. 8,401,573), entitled "PERSONAL WIRELESS COVERAGE MAP" and filed on Sep. 13, 2012, which is a continuation of U.S. patent application Ser. No. 11/969,038 (now U.S. Pat. No. 8,285,310), entitled "PERSONAL WIRELESS COVERAGE MAP" and filed on Jan. 3, 2008. U.S. patent application Ser. Nos. 11/969,038, 13/614,719 and 13/834,480 are hereby incorporated by reference in their respective entireties.

BACKGROUND

Devices that use wireless signaling are ubiquitous to contemporary life. Non-limiting examples of such (wireless) devices include cellular telephones, text messaging units, personal digital assistants (PDAs), and laptop and palmtop computers. Respective such devices typically include one or more modes of operation such as, for example, unidirectional or bidirectional voice, video and/or data communications, Internet accessibility, remote control functionality, etc.

However, such devices are dependent upon access to wireless resources (i.e., networks or infrastructure) external to the device in order for corresponding wireless functions to operate. For example, a cellular telephone requires a period of continuous signal access to a cellular network in order to initiate and maintain a call. Such external resources are, as a matter of practicality, finite in their geographic coverage range and scope of operational modes. In short, worldwide coverage for all wireless devices, everywhere that a user might want or need signal access, is not a reality.

Furthermore, various factors result in poor or non-existent signal access in areas that are otherwise proximate to wireless service infrastructure. As one example, a user might temporarily lose wireless signal access while traveling through a tunnel in a downtown area. In another example, a user is denied wireless access while stuck in traffic because other wireless users are utilizing all of the available support resources. These and other scenarios cause frustration and loss of productivity for users of wireless technology.

SUMMARY

This summary is provided to introduce general concepts of wireless service support methods and systems, which are further described below in the Detailed Description. This summary is not intended to identify essential features of the claimed subject matter, nor is it intended to limit the scope of the claimed subject matter.

In one aspect, method is provided including receiving a request at a wireless system, the request corresponding to a geographic area. The method also includes generating a map at the wireless system in accordance with the request. The map includes content corresponding to one or more wireless signal services associated with the geographic area. The method further includes providing the map from the wireless system to a wireless device by way of wireless signals.

In another aspect, at least one computer-readable storage media are provided, including a program code. The program code is configured to cause one or more processors to receive a request from a wireless device. The request corresponds to a geographic area. The program code further causes the one or more processors to generate a map in accordance with the request. The map includes content corresponding to one or more wireless signal services associated with the geographic area. The program code is further configured to cause one or more processors to provide the map to the wireless device by way of wireless signals.

In yet another aspect, a system is configured to generate a map, the map being configured to be displayed on a wireless device. The map includes content indicative of a geographic area, and one or more entities within the geographic area. The map also includes content indicative of one or more regions of the geographic area respectively associated with one or more wireless signal services, and a location of the wireless device within the geographic area.

BRIEF DESCRIPTION OF THE DRAWINGS

The detailed description is set forth with reference to the accompanying figures. The use of the same reference numbers in different figures indicates similar or identical items.

DETAILED DESCRIPTION

Overview

This disclosure is directed to providing wireless signal coverage mapping to users of wireless devices. Such a coverage map can include numerous sorts of information such as, for example, surface streets, areas of particular wireless signal services, areas where wireless signal service is inadequate or non-existent, recommended wireless signal corridors (routes) between user-specified points, and a host of others. The present disclosure is also directed to data acquisition pertaining to wireless signal sessions. The resulting accumulation of information can be leveraged in providing increasingly accurate and detailed wireless signal coverage mapping.

Illustrative Operating Scenario

Figure 1:
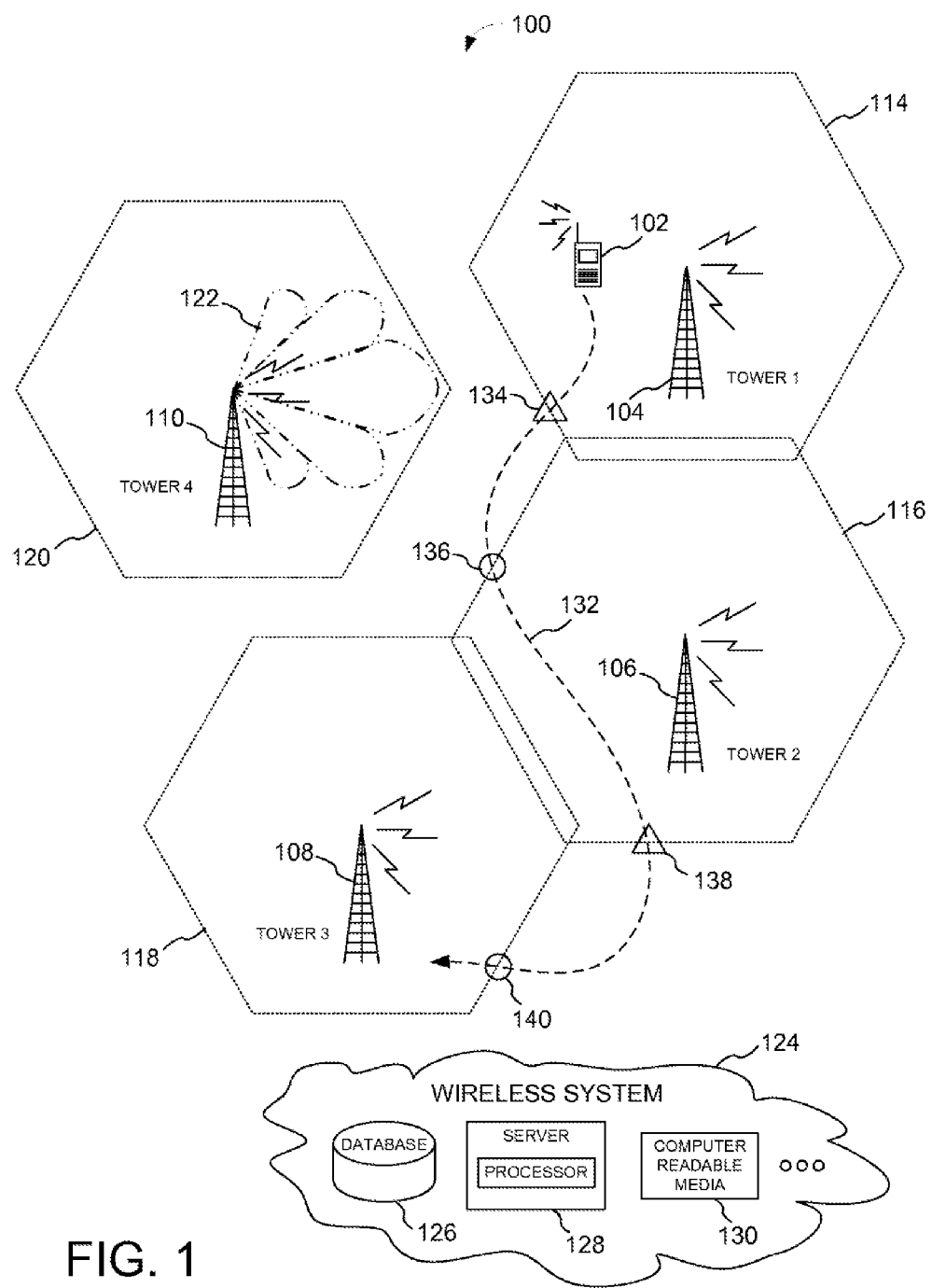
FIG. 1 is a diagrammatic view depicting an illustrative operating scenario.

FIG. 1 is a diagrammatic view depicting an illustrative operating scenario 100. In FIG. 1, a wireless device 102 is present and is presumed to be operated by a corresponding user (not shown). For purposes of ongoing example, it is assumed that the wireless device 102 is a cellular telephone. Other wireless devices 102 (e.g., laptop computers, PDAs, etc.) corresponding to other, similar operational scenarios are also contemplated within the scope of the present teachings. The wireless device 102 is portable in nature and is configured to operate in one or more modes as the user moves about within a wireless signal coverage area.

The scenario 100 also includes four cellular service towers 104, 106, 108 and 110, respectively. Each of the cellular towers 104, 106, 108, 110 includes an area of cellular (i.e., wireless) signal coverage 114, 116, 118 and 120, respectively. It is further noted that some of the coverage areas (e.g., 114 and 116; 116 and 118) exhibit some degree of overlap with each other. While the respective signal coverage areas 114, 116, 118, 120 are represented in FIG. 1 as hexagonal in shape, one of ordinary skill in the related arts will appreciate that such representation is a simplification for ease of understanding. In any case, each cellular service tower 104, 106, 108, 110 can provide signal coverage to a finite region about the respective tower. The cellular service tower 110 further includes a finite range of Wi-Fi® signal service as represented by coverage lobes 122. Wi-Fi® is a registered trademark owned by Wireless Ethernet Compatibility Alliance, Inc., Austin, Tex., USA.

The cellular towers 104, 106, 108, 110 are coupled to a wireless system (i.e., infrastructure) 124 (such coupling is not depicted in FIG. 1). The wireless system includes a database 126, a server 128 and computer-readable storage media 130. Non-limiting examples of the computer-readable storage media 130 include one or more optical disks, one or more magnetic storage media, one or more solid state memory devices, etc. The wireless system 124 can include any other resources (not shown) as needed to support one or more wireless services (e.g., cellular telephone, Internet access, etc.) for wireless devices (e.g., 102). Non-limiting examples of such wireless system 124 resources include additional databases, additional servers and/or computer systems, wireless signal analysis instrumentation, network and/or Internet access bridges, public switched telephone network (PSTN) interface equipment, wireless signal receivers, transmitters and/or transceivers, etc.

In one illustrative operation, a user of the wireless device 102 traverses a path 132. In doing so, the user leaves the signal coverage area 114 at a point 134 (represented by a triangle) and eventually enters the signal coverage area 116 at a point 136 (represented by a circle). The user continues to move along the path 132 and leaves the signal coverage area 116 at a point 138 and later enters the signal coverage area 118 at a point 140. Thus, the user experiences a loss of wireless signal (e.g., cellular) access between the points 134, 136 and between the points 138, 140. One or more wireless operations are not possible along the path 132 between the points 134-, 136 and 138, 140, giving rise to two "blackout periods" in the context of this illustration. Such blackout periods are a primary cause of frustration and inefficiency for users of wireless devices.

Illustrative Data Acquisition

Figure 2:
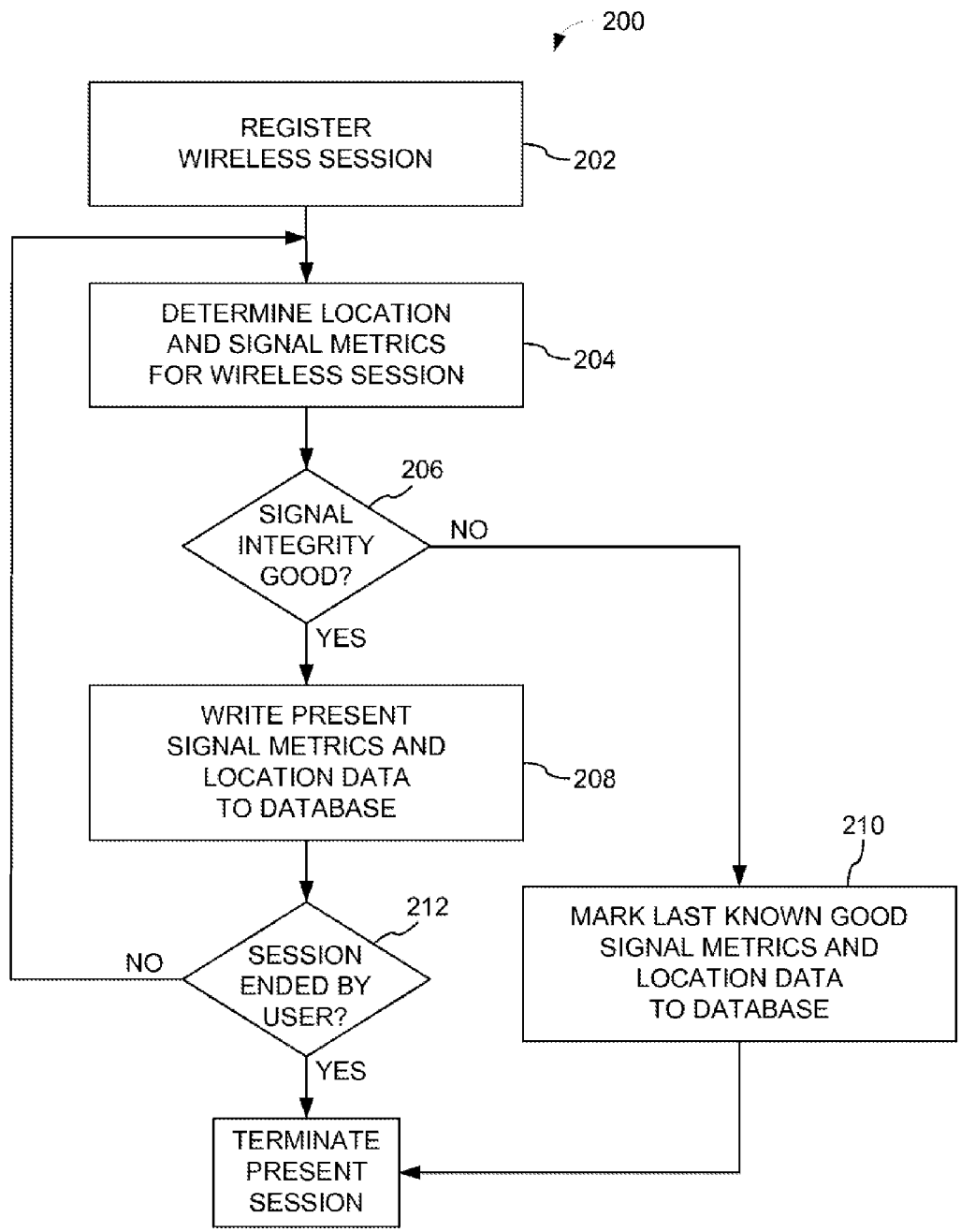
FIG. 2 is a flow diagram depicting a method in accordance with one embodiment.

FIG. 2 is a flow diagram depicting a method 200 in accordance with one exemplary embodiment. The method 200 includes particular method steps and a particular order of execution. However, other embodiments can also be used that deviate in one or more respects from the method 200 without departing from the scope of the present teachings. For purposes of non-limiting illustration, certain aspects of the method 200 will be described with reference to the operational scenario 100 of FIG. 1.

At 202, a wireless session is registered for a user by the wireless system 124. As used herein, "wireless session" refers to a period of time during which a wireless device, such as the wireless device 102, accesses a supporting wireless system, such as the wireless system 124. "Registration" refers to establishing communication between the wireless device 102 and one or more wireless resources of the system 124 and, in one or more embodiments, initiating a record within the database 126 of the wireless session. Such an initial record can include, for example, device and/or user identification, time and date, one or more wireless signal protocol types, and the nature and/or identity of resources to be accessed. Other initial information can also be included in the database 126 record.

At 204, the instantaneous geographic location and signal metrics for the present wireless session are determined by resources of the system 124. The geographic location of the wireless device 102 can be determined in any suitable way including, as non-limiting examples, global position system (GPS) signals received by the wireless device 102 and transmitted to the wireless system 124, triangulation on the wireless device 102 by way of fixed wireless access points (e.g., the cellular towers 104, 106, 108, 110), etc. Other methods of determining geographic location of the device 102, with some acceptable measure of precision, can also be used. Wireless signal metrics can include any quantified or classified wireless signal parameter of the wireless session including, for example, overall signal strength, signal-to-noise ratio (SNR), and failed versus successful wireless signal session status. Other quantified and/or classified wireless signal parameters can also be defined as wireless signal metrics.

At 206, the signal integrity of the wireless session is evaluated using one or more of the signal metrics determined at 204 above. If the signal integrity is evaluated as inadequate in comparison to one or more predetermined criteria—or if wireless communication with the wireless device 102 has failed altogether—then the method 200 proceeds to 210 as described below. If the signal integrity is determined to be acceptable, then the method 200 proceeds to 208 below.

At 208, the geographic location and signal metrics for the wireless session determined at 204 above are written to the database 126 as initiated at 202 above. The method 200 then proceeds to 212 below.

At 210, the last known good geographic location and signal metrics for the wireless session (as acquired on a previous iteration of steps 204-208) are marked or tagged as such within the database 126. The method 200 then terminates.

At 212, it is determined if the present wireless session has been ended (terminated) by the user of the wireless device 102. Such determination can be based upon, for example, communication of an "END CALL" data signal from the wireless device 102 to the system 124. The wireless session can be ended in other known ways, as well. If the wireless session has been ended, then such an indication is written to the database 126 and the method 200 then terminates. If the wireless session has not been ended by the user, the method 200 returns to 204 above.

The method 200 represents one suitable embodiment for acquiring data pertaining to wireless sessions and storing that data (typically, but not necessarily) as discrete records (one record per wireless session) into a database, such as the database 126. In this way, a growing deposit of information, including records corresponding to any number of wireless system users (i.e., clients) can be accumulated over time and analyzed for meaningful information. As one example, poor signal strength or "call dropping" in an area can indicate localities where additional wireless system 124 resources are needed. Furthermore, such information can be used to advise users of wireless devices about areas prone to, or presently experiencing, wireless access trouble.

The method 200 of FIG. 2 is illustrative of numerous wireless session data acquisition schemes in accordance with the present teachings. Other methods including some or all of the steps 202, 205, 206, 208, 210, 212, 214 described above, or other steps, and/or other sequences of execution can also be used and are within the scope of the present teachings. The method 200 and/or suitable variations thereon can be implemented by way of dedicated-purpose system resources, and/or one or more processor-based devices operating under software (e.g., the media 130) control, etc. Furthermore, multiple instances of the method 200 can be performed contemporaneously, wherein each instance corresponds to a respective wireless session and associated user. Thus, records within the database 126 (or other suitable storage entity or entities) can be increasing (evolving) on a nearly continuous basis.

Illustrative Coverage Mapping

Figure 3:
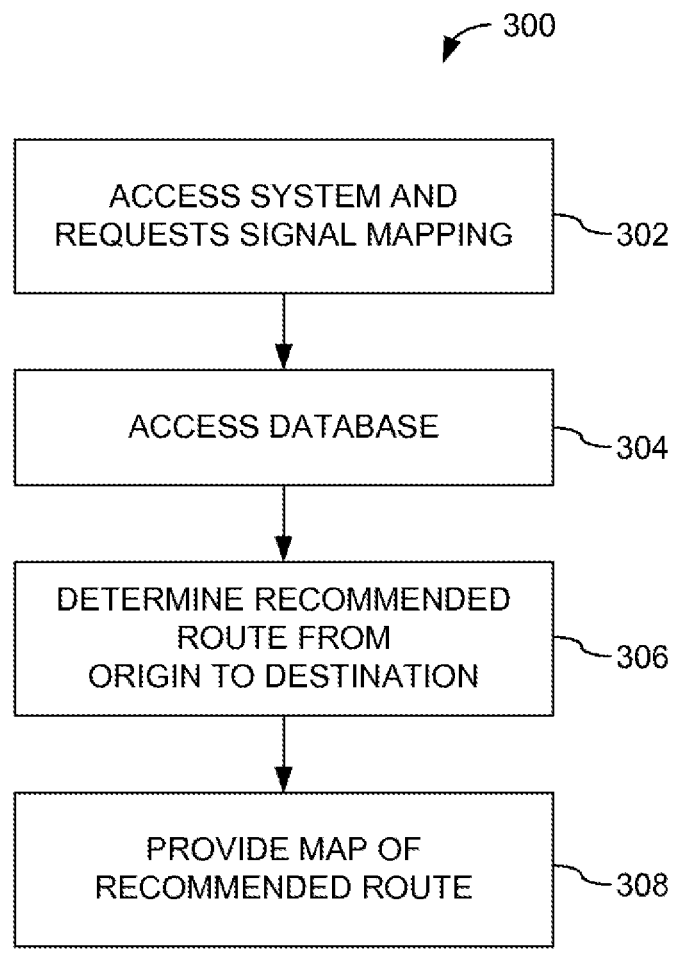
FIG. 3 is a flow diagram depicting a method in accordance with another embodiment.

FIG. 3 is a flow diagram depicting a method 300 in accordance with another embodiment. The method 300 includes particular method steps and a particular order of execution. However, other embodiments can also be used that deviate in one or more respects from the method 300 without departing from the scope of the present teachings. For purposes of non-limiting illustration, certain aspects of the method 300 will be described with reference to the operational scenario 100 of FIG. 1.

At 302, a wireless device, such as the wireless device 102, accesses a wireless system, such as the wireless system 124, and requests signal coverage mapping from their present location to a user-defined destination. In another embodiment, a user can select from a number of previously defined and stored origin-and-destination pairs, or sets including three or more points of interest (e.g., origin, intermediate point, and destination). The user's present location can be determined by user input, GPS location signaling, or other suitable means. In any case, the corresponding wireless system 124 is aware of the user's origin and destination.

At 304, the wireless system 124 accesses the database 126, and possibly other system 124 resources (not shown), having information relevant to the user's request. Such information can include geographic information, roads and highways, types and locations of wireless support resources, areas of known inadequate (i.e., poor) or non-existent wireless signal coverage, real-time information regarding wireless signal outages, restricted wireless usage zones, and other data. Such data can, for example, have been acquired at least in part by way of the method 200 of FIG. 2 as described above. Furthermore, such data can be representative of any number of wireless users operating previously or presently within the geographic region of interest.

At 306, the wireless system 124 determines a recommended route for the user to traverse between the specified origin and destination points. This determination is made in accordance with the user's desired wireless service type(s) (i.e., protocol(s)), the available wireless support resources, and/or known locations of heavy wireless usage, etc. The determination is further based upon a predetermined likelihood that such wireless service type(s) will be continuously (or nearly so) available. For example, a determination can be directed to calculating a route along which wireless Internet access is continuously available at least ninety-five percent of the time according to historical data within the database 126. Other predetermined likelihoods and similar criteria can also be used.

At 308, the system 124 provides a signal coverage map including the recommended route to the wireless device 102 of the user. The map can use various combinations of color, symbology, indicia, routing arrows, text labeling, and other features in order to convey a readily understood advisory to the user. Non-limiting examples of such maps are described in further detail hereinafter.

The method 300 of FIG. 3 is illustrative of numerous wireless signal coverage mapping and routing advisories that can be provided in response to a user request. Other methods including some or all of the steps 302, 304, 306, 308 described above, or other steps, and/or other sequences of execution can also be used and are within the scope of the present teachings. The method 300 and/or suitable variations thereon can be implemented by way of dedicated-purpose system resources, one or more processor-based devices operating under software (e.g., media 130) control, etc.

Figure 4:
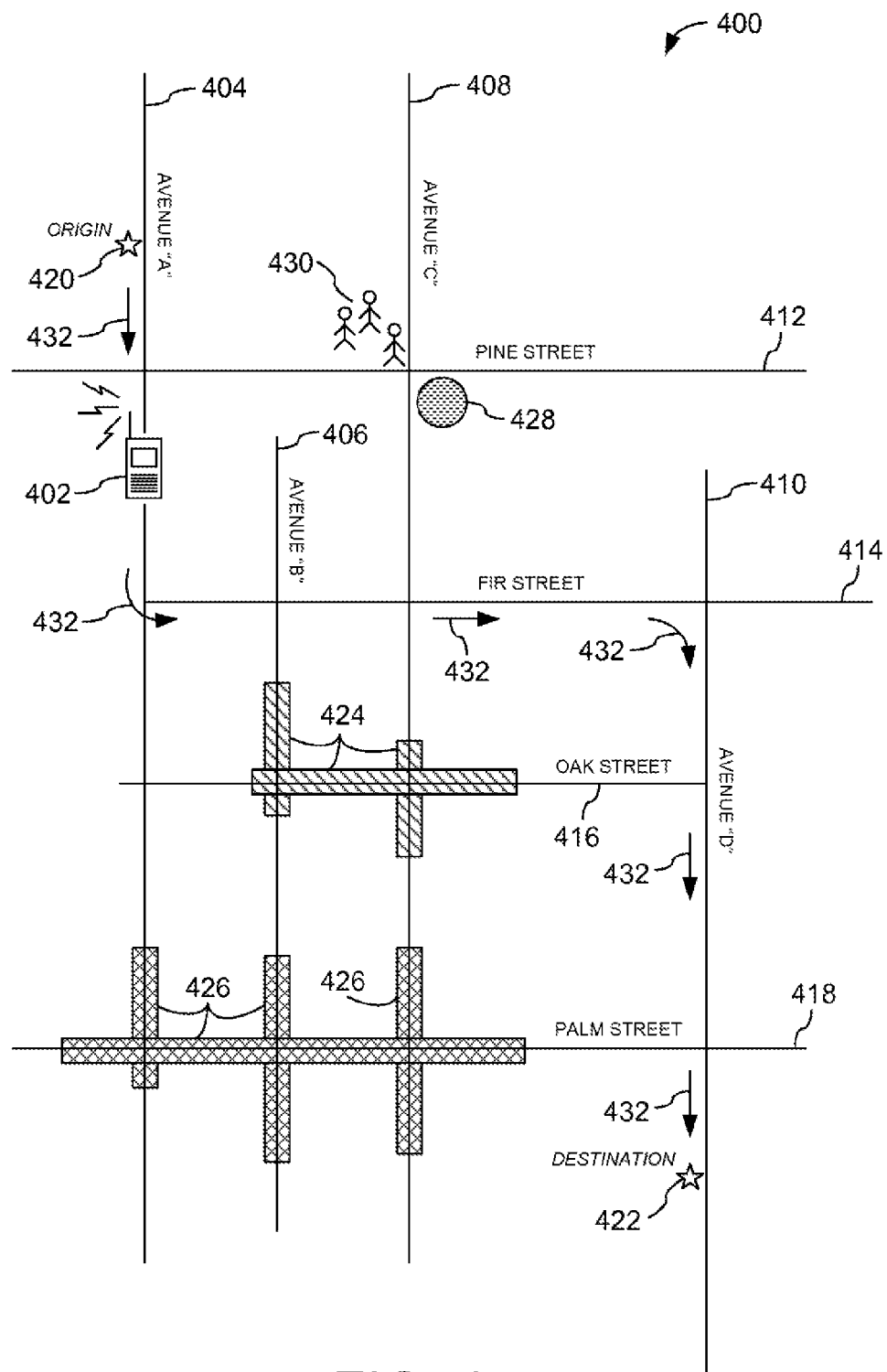
FIG. 4 is a diagrammatic view depicting a signal coverage map in accordance with one embodiment.

FIG. 4 is a diagrammatic view depicting one illustrative example of a wireless signal coverage map (hereinafter, map) 400 in accordance with exemplary embodiments. For purposes of illustration, it is assumed that the map 400 was provided to and displayed upon a wireless device 402 in response to a user request. It is also assumed that the map 400 was determined (i.e., derived, or generated) substantially as described above in regard to the method 300 of FIG. 3. However, other suitable methods within the scope of the present teachings can also be used to generate and provide the map 400.

The map 400 includes respective labeled roadways 404, 406, 408, 410, 412, 414, 416, 418, inclusive. Thus, the map 400 generally depicts a street-level representation of an area of user interest. The map 400 also includes an origin icon (origin) 420 and a destination icon (destination) 422. The origin 420 and destination 422 correspond to user input provided at the time of the request for the map 400.

The map 400 of FIG. 4 further includes regions 424 and 426, respectively. The regions 424 and 426 indicate areas of known or historically inadequate (or non-existent) wireless signal coverage, with a particular hatch pattern indicating the type (or types) of poor or missing signal coverage within that region. For example, the region 424 can be indicative of a total lack of CDMA-type cellular phone coverage. As another example, the region 426 can indicate historically inadequate iDEN-type signal service. More particularly, the regions 424 and 426 correspond to respective sections of the roadways 406, 408, 416 and 418 for which wireless signal metrics data is available and indicative of inadequate or non-existent service. Other hatch patterns, colors, and/or other symbology can be used to indicate areas (i.e., roadway sections, buildings, etc.) where corresponding types of wireless signal coverage are poor or lacking. The map 400 symbology can also be keyed to the names of one or more commercial wireless service providers rather than by signal protocol types.

In another example, symbology can be used within the map 400 (or another embodiment) to indicate areas where wireless signal service is provided by way of a commercial entity other than a primary service provider to the user. Under such a circumstance, the user is advised that additional access charges do (or potentially) apply. Thus, the user can readily identify regions (e.g., 424 and 426) to be avoided if wireless service of corresponding type(s) is necessary, or if access through a particular commercial service provider is undesirable.

The map 400 also includes a region 428. The region 428 can indicate an area where wireless service of a particular type is known to be provided. As one non-limiting example, the region 428 can indicate a Wi-Fi® zone. Other symbols, colors or graphic elements can be used to indicate the presence of various wireless service regions or hubs. The map 400 further includes a crowd symbol or icon 430. The crowd symbol 430 can indicate, for example, that the cellular service in that area is presently experiencing heavy usage above a predetermined threshold or at operating capacity. Thus, cellular service may not be available to another user entering the vicinity of the crowd symbol 430.

The map 400 of FIG. 4 also includes directional or routing arrows 432. The arrows 432 outline a recommended path for the user of the wireless device 402 to traverse between the origin 420 and the destination 422 that is most likely to provide continuous (or most nearly so) wireless service of the requested type(s). As depicted, the user is advised to traverse along "AVENUE 'A'" (roadway 404), then along "FIR STREET" (roadway 414), and finally along "AVENUE 'D'" (roadway 410) to the reach the destination 422.

The map 400 is illustrative of any number of maps that can be devised (i.e., automatically generated) and provided to the wireless device 402 in response to a user request. The map 400, as described above, provides graphical information regarding both available wireless services (e.g., Wi-Fi zone 428) and regions where certain wireless services are lacking (e.g., regions 424 and 426). Furthermore, the map 400 includes advisory information (e.g., arrows 432) intended to guide a user along a pathway automatically determined to provide the highest likelihood of continuous wireless signal coverage. The map 400 can be considered a personal wireless coverage map in the sense that symbology included therein is customized to the user's particular request for wireless signal service information for that geographical region. Other maps including some or all of the symbology described above, or other symbology altogether, can also be used.

Figure 5:
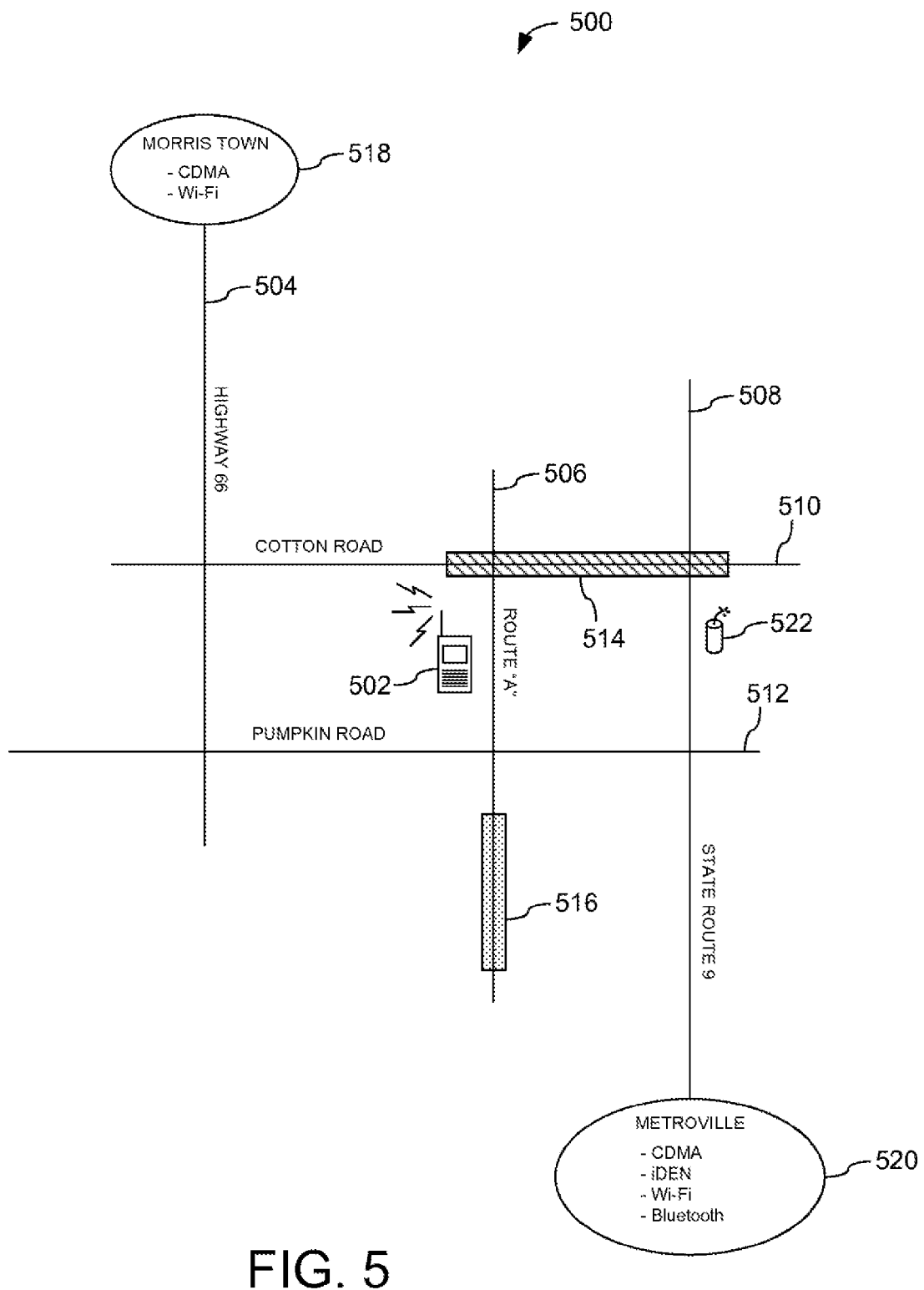
FIG. 5 is a diagrammatic view depicting a signal coverage map in accordance with another embodiment.

FIG. 5 is a diagrammatic view depicting one illustrative example of a signal coverage map 500 in accordance with another embodiment. For purposes of illustration, it is assumed that the map 500 was provided to a wireless device 502 in response to a user request, and was generated substantially as described above in regard to the method 300 of FIG. 3. However, other suitable methods within the scope of the present teachings can also be used to generate and provide the map 500.

The map 500 includes an icon indicative of the wireless device 502 to which the map 500 was provided. As depicted, the device 502 is located substantially at the center of the map 500. Thus, the map 500 is illustrative of a response directed to a user's request for wireless signal coverage within a particular region and is not necessarily aimed at providing a recommended route between points. Therefore, the map 500 differs in its general purpose with respect to the map 400 of FIG. 4.

The map 500 includes labeled roadways 504, 506, 508, 510, 512, inclusive. The map 500 also includes regions 514 and 516, respectively indicative of poor (or non-existent) wireless signal service of corresponding types. It is thus assumed that areas (i.e., roadways) not within (approximately) the regions 514 and/or 516 have known or historically acceptable wireless signal coverage of the type(s) relevant to the device 502 user's request.

The map 500 also includes symbols 518 and 520. The symbol 518 is indicative of a small town and provides a listing of wireless services available there. In turn, the symbol 520 is indicative of a larger city and provides a listing of wireless services available there. The map 500 further includes a blasting symbol 522, indicative of an area where wireless signal (radio) operation is restricted or banned in accordance with applicable regulations.

The maps 400 and 500 are illustrative of numerous signal coverage maps that can be provided in accordance with the present teachings. While the maps 400 and 500 include particular respective symbols and other content, one of ordinary skill in the art will appreciate that other symbols, colors, icons, text labels and/or advisories, and other graphical content can be included in other embodiments. Non-limiting examples of map content include indications corresponding to various entities such as freeways, surface roads, highways, bridges, rivers and/or other water features, buildings, public services, police stations, parks, points of interest, shopping centers, vehicle service garages, public transit centers, etc.

The present teachings encompass an essentially unlimited number of various wireless signal coverage maps that can be determined and provided to users by way of respective wireless devices (e.g., 102, etc.). In turn, such maps can be directed to guiding a user along a wireless signal service corridor between points, advise a user to seek (or avoid) certain wireless signal service areas, and provide general wireless signal availability information for a particular geographic area. A user can also request signal coverage mapping information about an area different than the user's present location. Thus, a user can access information about another local prior to visiting that area. Furthermore, coverage mapping can be provided or updated on a periodic, real-time basis in accordance with a user's changing location, changes in available wireless service coverage, or other criteria.

Personal wireless signal coverage maps of the present teachings can be based, at least in part, on database information acquired substantially as described above in regard to the method 200. In one or more embodiments, new wireless signal data can be acquired and added in an ongoing manner. In this way, map information and content can be evolutionary in nature and improve in accuracy, detail and/or timeliness as more data about a particular geographic area is accumulated. In one or more embodiments, wireless signal data is acquired in accordance with the method 200, while wireless signal coverage mapping is being provided in accordance with the method 300. Thus, data acquisition and map provisioning can be performed in a substantially simultaneous fashion.

CONCLUSION

Although the disclosure has been made in language specific to structural features and/or methodological acts, it is to be understood that the disclosed concepts are not necessarily limited to the specific features or acts described. Rather, the specific features and acts are disclosed as exemplary implementations.

What is claimed is:

1. A method to provide a map to a wireless device, the method comprising:
   in response to a request received from the wireless device, processing wireless session records with a processor to determine respective status of a plurality of wireless services in a first geographic region associated with the wireless device;
   based on the processing of the wireless session records, generating, with the processor, map data identifying a location of the wireless device, a status of a first one of the wireless services in a second geographic region included in the first geographic region, and a status of a second one of the wireless services in a third geographic region included in the first geographic region; and
   transmitting the map data to the wireless device.

2. The method of claim 1, wherein the first one of the wireless services is unavailable in the second geographic region but is available in a fourth geographic region included in the first geographic region, and the map data indicates that the first one of the wireless services is unavailable in the second geographic region.

3. The method of claim 2, wherein the fourth geographic region corresponds to a portion of the first geographic region not including the second geographic region.

4. The method of claim 2, wherein the second one of the wireless services is unavailable in the third geographic region but is available in a fifth geographic region included in the first geographic region, and the map data indicates that the second one of the wireless services is unavailable in the third geographic region.

5. The method of claim 1, wherein the wireless session records include location information and signal metrics for wireless sessions associated with a plurality of wireless devices.

6. The method of claim 5, wherein the wireless sessions are associated with the first geographic region.

7. The method of claim 1, wherein the processing of the wireless session records includes processing the wireless session records to determine whether the first geographic region includes a zone in which wireless operation is restricted, and generating the map data includes generating the map data to identify the zone of the first geographic region in which wireless operation is restricted.

8. A computer readable memory including computer readable instructions which, when executed, cause a computer processor to perform operations comprising:
in response to a request received from a wireless device, processing wireless session records to determine respective status of a plurality of wireless services in a first geographic region associated with the wireless device;
based on the processing of the wireless session records, generating map data identifying a location of the wireless device, a status of a first one of the wireless services in a second geographic region included in the first geographic region, and a status of a second one of the wireless services in a third geographic region included in the first geographic region; and
transmitting the map data to the wireless device.

9. The computer readable memory of claim 8, wherein the first one of the wireless services is unavailable in the second geographic region but is available in a fourth geographic region included in the first geographic region, and the map data indicates that the first one of the wireless services is unavailable in the second geographic region.

10. The computer readable memory of claim 9, wherein the fourth geographic region corresponds to a portion of the first geographic region not including the second geographic region.

11. The computer readable memory of claim 9, wherein the second one of the wireless services is unavailable in the third geographic region but is available in a fifth geographic region included in the first geographic region, and the map data indicates that the second one of the wireless services is unavailable in the third geographic region.

12. The computer readable memory of claim 8, wherein the wireless session records include location information and signal metrics for wireless sessions associated with a plurality of wireless devices.

13. The computer readable memory of claim 12, wherein the wireless sessions are associated with the first geographic region.

14. The computer readable memory of claim 8, wherein the processing of the wireless session records includes processing the wireless session records to determine whether the first geographic region includes a zone in which wireless operation is restricted, and generating the map data includes generating the map data to identify the zone of the first geographic region in which wireless operation is restricted.

15. An apparatus comprising:
memory including computer readable instructions; and
a processor to execute the computer readable instructions to perform operations including:
in response to a request received from a wireless device, processing wireless session records to determine respective status of a plurality of wireless services in a first geographic region associated with the wireless device;
based on the processing of the wireless session records, generating map data identifying a location of the wireless device, a status of a first one of the wireless services in a second geographic region included in the first geographic region, and a status of a second one of the wireless services in a third geographic region included in the first geographic region; and
transmitting the map data to the wireless device.

16. The apparatus of claim 15, wherein the first one of the wireless services is unavailable in the second geographic region but is available in a fourth geographic region included in the first geographic region, and the map data indicates that the first one of the wireless services is unavailable in the second geographic region.

17. The apparatus of claim 16, wherein the fourth geographic region corresponds to a portion of the first geographic region not including the second geographic region.

18. The apparatus of claim 16, wherein the second one of the wireless service is unavailable in the third geographic region but is available in a fifth geographic region included in the first geographic region, and the map data indicates that the second one of the wireless services is unavailable in the third geographic region.

19. The apparatus of claim 15, wherein the wireless sessions are associated with a plurality of wireless devices operating in the first geographic region.

20. The apparatus of claim 15, wherein processing the wireless session records includes processing the wireless session records to determine whether the first geographic region includes a zone in which wireless operation is restricted, and generating the map data includes generating the map data to identify the zone of the first geographic region in which wireless operation is restricted.

* * * * *